(12) United States Patent
Ashcraft

(10) Patent No.: US 10,408,470 B2
(45) Date of Patent: Sep. 10, 2019

(54) HEATER FOR GAS FURNACE CONDENSATE DRAIN SYSTEM

(71) Applicant: Allied Air Enterprises LLC, West Columbia, SC (US)

(72) Inventor: Walter M. Ashcraft, Columbia, SC (US)

(73) Assignee: Allied Air Enterprises LLC, West Columbia, SC (US)

(*) Notice: Subject to any disclaimer, the term of this patent is extended or adjusted under 35 U.S.C. 154(b) by 157 days.

(21) Appl. No.: 15/347,134

(22) Filed: Nov. 9, 2016

(65) Prior Publication Data

US 2017/0130970 A1  May 11, 2017

Related U.S. Application Data

(60) Provisional application No. 62/252,969, filed on Nov. 9, 2015.

(51) Int. Cl.
| | | |
|---|---|---|
| *F24D 19/00* | (2006.01) | |
| *F24H 8/00* | (2006.01) | |
| *F25D 21/08* | (2006.01) | |
| *B23P 19/00* | (2006.01) | |

(52) U.S. Cl.
CPC .......... *F24D 19/0095* (2013.01); *B23P 19/00* (2013.01); *F24H 8/006* (2013.01); *F25D 21/08* (2013.01)

(58) Field of Classification Search
CPC ...... F24D 19/0095; B23P 19/00; F24H 8/006; F25D 21/08
See application file for complete search history.

(56) References Cited

U.S. PATENT DOCUMENTS

| | | | | |
|---|---|---|---|---|
| 2,979,918 A | * | 4/1961 | Atchison | F24F 13/224 |
| | | | | 62/156 |
| 4,337,823 A | * | 7/1982 | DelPercio | F24H 3/062 |
| | | | | 165/122 |
| 5,704,343 A | * | 1/1998 | Ahn | F24H 8/006 |
| | | | | 126/110 R |
| 2005/0034471 A1 | * | 2/2005 | Shin | F24F 1/16 |
| | | | | 62/285 |
| 2006/0021370 A1 | * | 2/2006 | Cho | F24F 1/027 |
| | | | | 62/262 |
| 2014/0116357 A1 | * | 5/2014 | Yano | F24H 9/2035 |
| | | | | 122/14.2 |

* cited by examiner

*Primary Examiner* — Larry L Furdge
(74) *Attorney, Agent, or Firm* — Baker Botts L.L.P.

(57) ABSTRACT

A system and method is described for a heater box or compartment within a gas furnace or other HVAC cabinet. The compartment can house drain hoses, drain traps, and other components used to collect and dispose of condensate. The compartment can comprise heating elements or thermostatic switches to assist in preventing the freezing of condensate.

14 Claims, 12 Drawing Sheets

HEATER FOR GAS FURNACE CONDENSATE DRAIN SYSTEM

CROSS REFERENCE TO RELATED INFORMATION

This application claims the benefit of U.S. Provisional Patent Application No. 62/252,969, filed Nov. 9, 2015, titled "Heater for Gas Furnace Condensate Drain System" the contents of which are hereby incorporated herein in its entirety.

TECHNICAL FIELD

The present disclosure is directed to HVAC systems and in particular to condensate drain systems.

BACKGROUND OF THE INVENTION

Gas furnaces and other HVAC systems can develop condensate on various components as water vapor condensates onto a component surface. HVAC systems typically include drainage systems so that condensate is collected and drained away from areas where condensate buildup could be detrimental. During cold ambient conditions a condensate drainage system can be susceptible to freezing.

BRIEF SUMMARY OF THE INVENTION

One embodiment of the present disclosure comprises a heated compartment within an HVAC cabinet, the compartment comprising: a plurality of panels forming an enclosure around an upper and lower drain hose, a drain fitting, and a drain trap; at least one heater attached to a first side of the plurality of panels; insulation attached to a second side of the plurality of panels; and a thermostatic switch within the enclosure and coupled to the plurality of heaters, the thermostatic switch operable to measure the temperature within the enclosure and activate the plurality of heaters when the temperature within the enclosure reaches a predetermined level.

Another embodiment of the present disclosure comprises a heated compartment within an HVAC cabinet, the compartment comprising: one or more panels forming an enclosure with another of the one or more panels or with one or more walls of the HVAC cabinet, wherein the enclosure substantially surrounds at least one of a drain hose, a drain fitting, and a drain trap; at least one heater attached to a first side of the one or more panels; insulation attached to a second side of the one or more panels; and a thermostatic switch within the enclosure and coupled to the plurality of heaters, the thermostatic switch operable to measure the temperature within the enclosure and activate the plurality of heaters when the temperature within the enclosure reaches a predetermined level.

Another embodiment of the present disclosure comprises a method of constructing a heated compartment in an HVAC cabinet, the method comprising: providing a drain trap disposed within the HVAC cabinet; providing one or more drain hoses configured to direct condensation within the HVAC cabinet into the drain trap; providing one or more connectors configured to direct condensation from the drain trap to the exterior of the HVAC cabinet; configuring one or more panels to substantially enclose the drain trap, at least one of the one or more drain hoses, and at least one of the one or more connectors, against one or more walls of the HVAC cabinet; providing at least one heater on an interior side of the one or more panels; and coupling a thermostatic switch to the at least one heater, the thermostatic switch configured to measure a temperature and activate the at least one heater when the measured temperature reaches a predetermined level.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims. The novel features which are believed to be characteristic of the invention, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present invention.

BRIEF DESCRIPTION OF THE DRAWINGS

For a more complete understanding of the present invention, reference is now made to the following descriptions taken in conjunction with the accompanying drawings, in which.

DETAILED DESCRIPTION OF THE INVENTION

With any high-efficiency gas-fired condensing furnace there are issues with effectively draining the condensate produced in the heat exchanger, and these issues are more complicated if the furnace is installed in a location where this condensate is subject to freezing. Ice can block drain hoses or traps and prevent the furnace from starting and operating. In some furnaces the internal condensate drain components are located in a compartment that directly communicates with the outside ambient air, and in unfavorable conditions the furnace condensate can freeze. Although some installers wrap drain lines that are external to the furnace cabinet with electric heat tape to prevent freezing, this field installation introduces variability and creates additional work at the job site. Most importantly, this typically will not protect drain hoses and components located inside the furnace cabinet from freezing. If the condensate freezes in the internal system of a typical condensing furnace either during a long off cycle or during a cold-weather power outage, the furnace may not start and cannot self-recover. In typical prior art systems there is an efficiency value of about 80%, and not much condensate is formed. However, in more modern systems with efficiencies of about 90% or more there is more resulting condensate. Unfortunately, in cold temperatures this condensate can freeze and cause damage to the HVAC system. The present disclosure helps to solve the problems of freezing condensate.

One embodiment of the present disclosure comprises a gas furnace with an enclosed heated compartment that can contain a furnace drain trap, drain hoses, and drain fittings and isolates them from the outdoor air that is pulled into the furnace cabinet. The teachings prevent the furnace condensate from freezing after a long off cycle, and enables the furnace to self-recover (after power restoration) if the furnace condensate freezes during a cold-weather power outage. A formed sheet metal panel can create the compartment, which contains an integral low-voltage heating element to maintain component temperatures above a predetermined level. The heating element can comprise a flexible foil resistance heater adhered to the sheet metal compartment panel along its inner surfaces. The embodiment can include a thermostatic switch to control the operation of the heating element. This ensures the element operates during low air temperatures only, which prevents unnecessary energy consumption during the summer, extends the operating life of the heating element, and prevents the heating element from overheating the components inside the compartment. The exterior of the compartment can be insulated to protect the drain system components from cold temperatures, and to prevent heat loss from the compartment. All components can be factory-installed and require no additional work or time at the job site for the installer.

Figure 1:
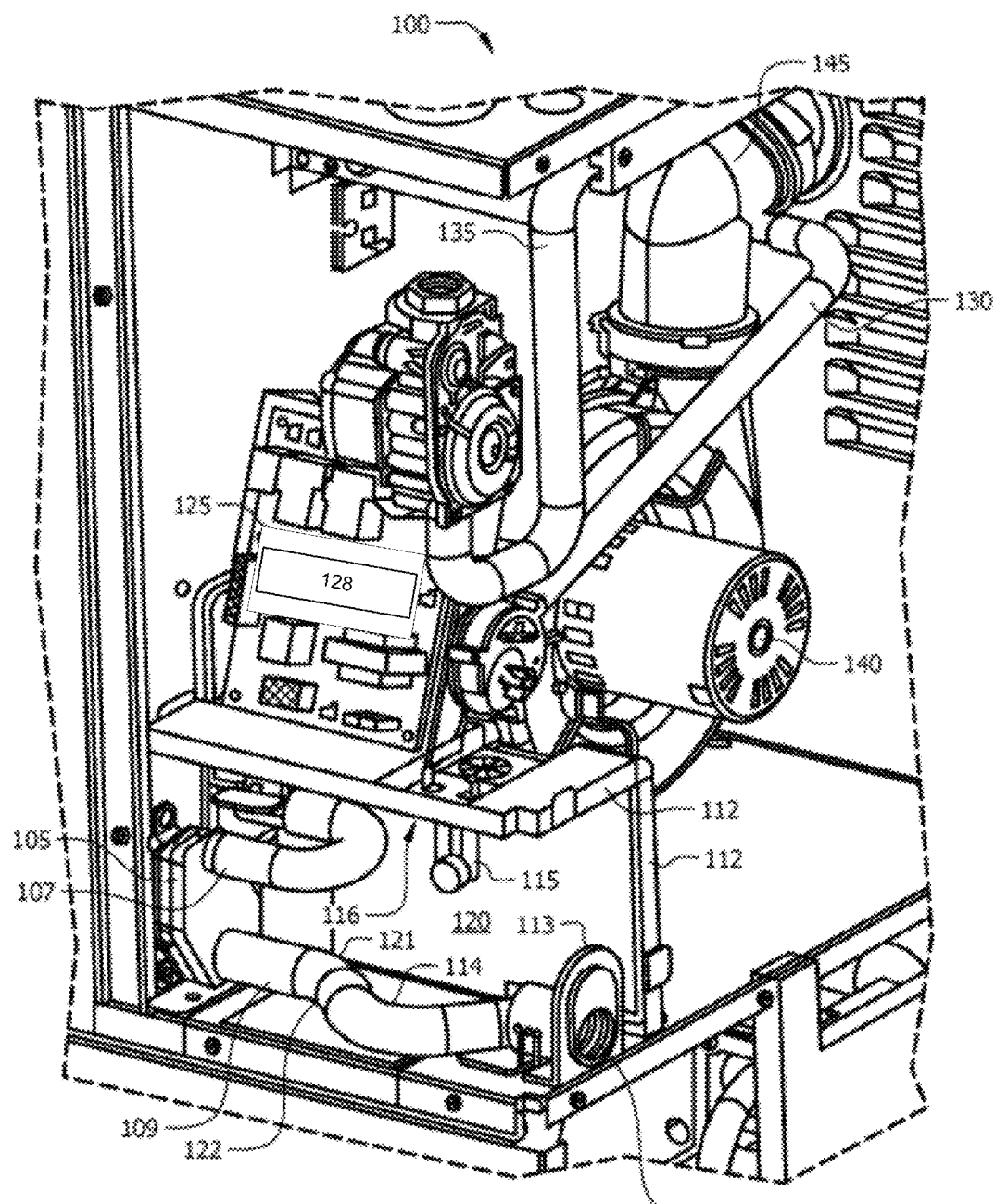
FIG. 1 is a diagram of an embodiment of a gas furnace under the present disclosure.

Referring to FIG. 1, one embodiment of the present disclosure can be described. FIG. 1 shows an embodiment of an HVAC cabinet 100. Cabinet 100 contains an inducer motor 140, control board bracket 125, gas manifold 135, inducer exhaust 145, and exhaust condensate hose 130. Cabinet 100 also contains condensate heater box 120. Heater box 120 is installed to provide heating and insulation so that the condensate in upper and lower drain hoses 107, 109 and drain trap 105 do not freeze. The upper and lower drain hoses 107, 109 and drain trap 105 collect and transport condensate from the system, including from the exhaust condensate hose 130. Heater box 120 can be formed from sheet metal plates 113 (side), 114 (bottom), and 116 (top). The other sides of the box 120 will be provided by the walls of cabinet 100. Insulation 112 can surround some or all sides of heater box 120. A resistance heater(s) 121, 122 can be placed along sides 113 and 114 respectively. Resistance heaters 121, 122 can comprise multiple heaters or a single heater folded to fit onto multiple sides of the heater box 120. Thermostatic switch 115 extends into heater box 120. As the temperatures within the heater box fall below a set value, 34° F. for example, the thermostatic switch 115 turns on heaters 121, 122 to thaw the condensate in the upper and lower drain hoses 107, 109 and drain trap 105. Condensate from the HVAC system flows into upper drain hose 107, into drain trap 105, into lower drain hose 109 and then through drain fitting 110. Drain fitting 110 can connect to a hose (not shown) that delivers the condensate to a drain in a floor or elsewhere. Heater box 120 can comprise a venting hole in one of the side panels.

Figure 2:
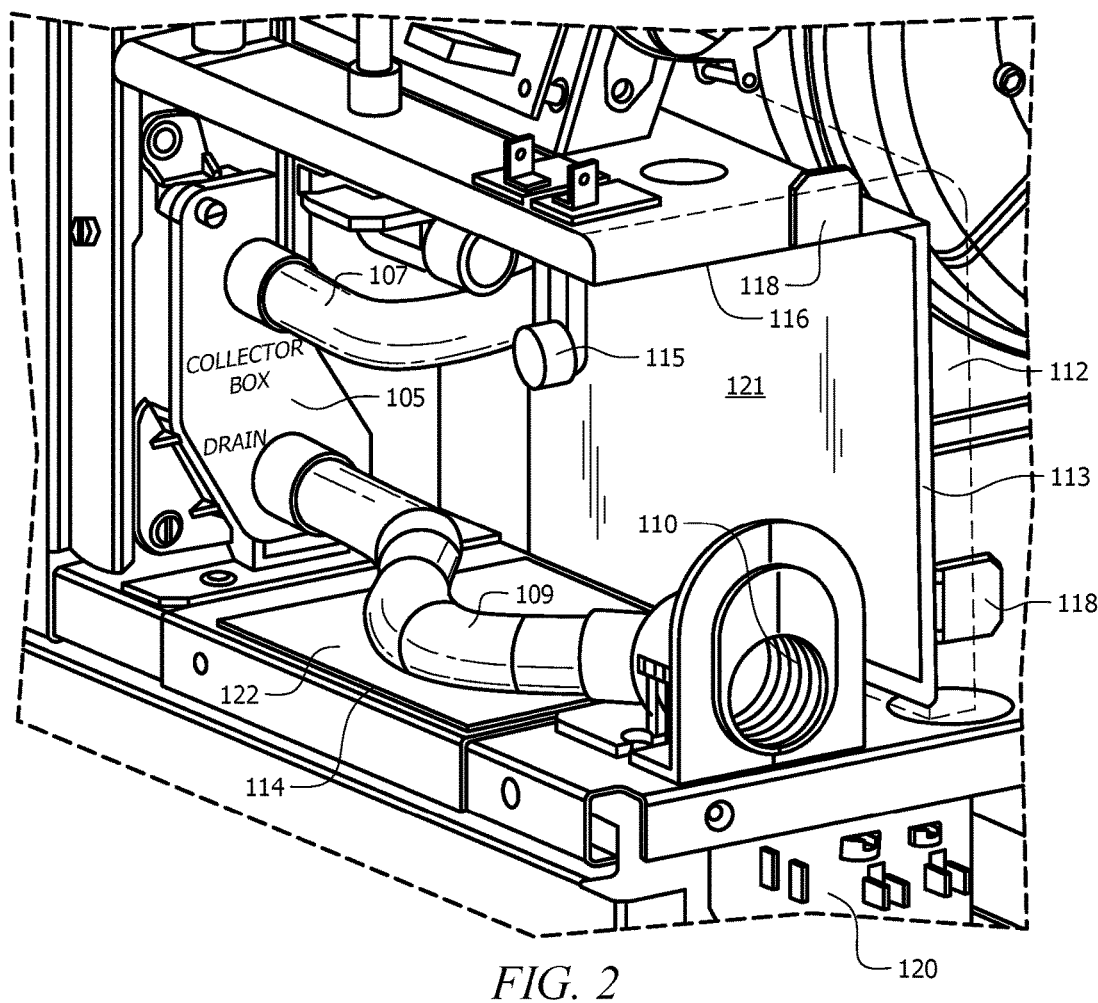
FIG. 2 is a diagram of an embodiment of a heater box under the present disclosure.
Figure 3A:
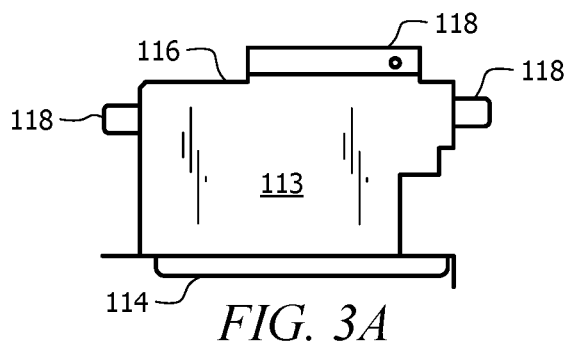
FIGS. 3A-3F are diagrams of embodiments of components of a heater box under the present disclosure.
Figure 3B:
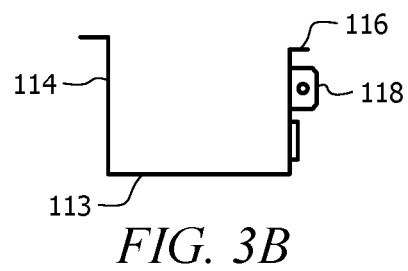
Figure 3C:
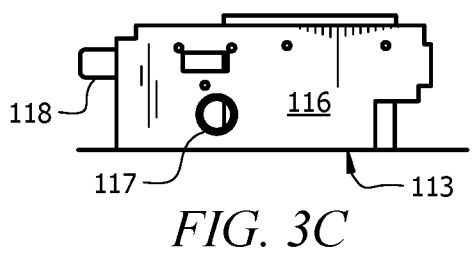
Figure 3D:
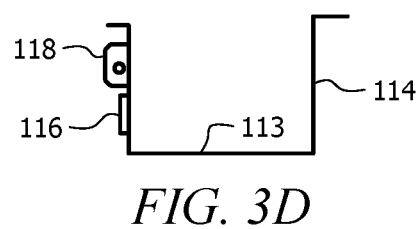
Figure 3E:
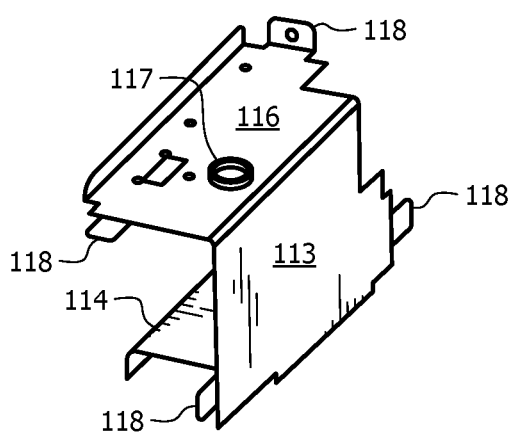
Figure 3F:
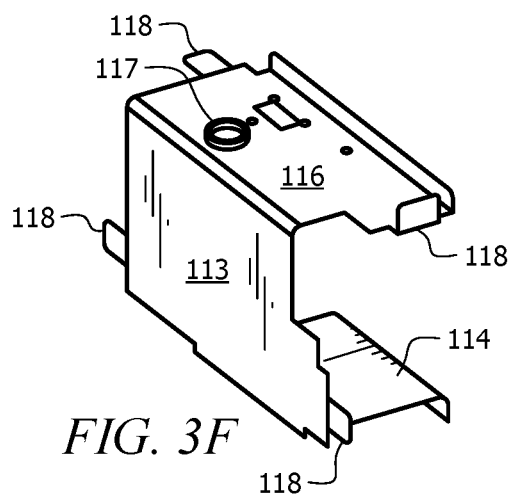
Figure 4A:
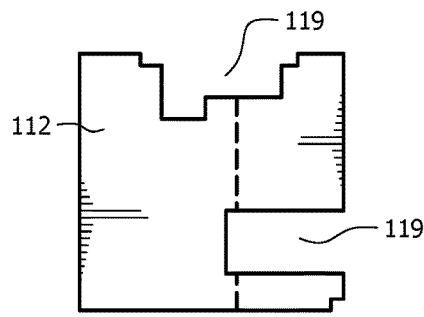
FIGS. 4A-4D are diagrams of embodiments of components of a heater box under the present disclosure.
Figure 4B:
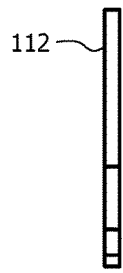
Figure 4C:
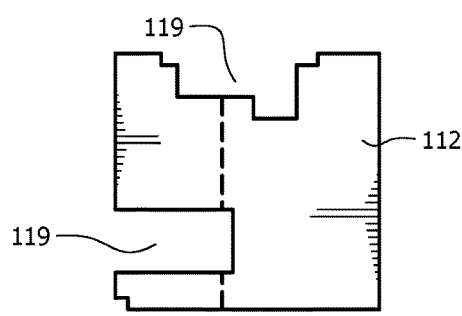
Figure 4D:
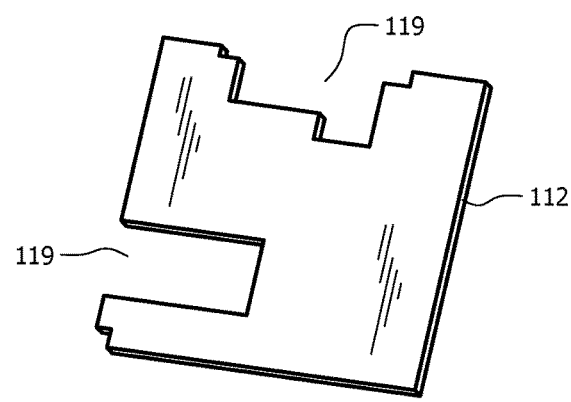

FIG. 2 shows a more close-up view of heater box 120. Upper and lower drain hoses 107, 109, drain trap 105 and drain fitting 110 are shown. The sides 113, 114 and 116 of the heater box 120 can be seen. Insulation 112 (shown transparently) surrounds several sides of the heater box 120. Tabs 118 are located at various points along heater box 120. Tabs 118 can be located at various locations and can help to either attach to other components (such as the side walls of an HVAC cabinet) or to keep insulation 112 in place. Resistance heaters 121 and 122 attach to the inside surface of several sides, in this case sides 113 and 114 respectively.

The displayed embodiments show the heater box 120 located in a certain corner and side of the cabinet 100. However, other geometries and locations of the heater box 120 are possible. Different cabinets might locate the drain hoses and drain trap in different locations, with different measurements and dimensions. Nevertheless, a heater box can be adjusted to fit a variety of embodiments. Some embodiments may even require a plurality of heater boxes. Furthermore, placement of various components can change according to the geometry of a given embodiment. Placement, size, orientation, shape, etc. of tabs, heaters, insulation, hoses, fittings and more can change according to a given embodiment.

FIG. 3A to FIG. 7 show possible embodiments of a variety of components of the heater box 120 and how such components can fit together.

FIGS. 3A-3F show several views of an embodiment of heater box 120 with sides 113, 114, 116. FIGS. 3A-3F show the C-shaped heater box 120 from a variety of angles. In some angles the switch hold 117 can be seen. Thermostatic switch 115 extends through switch hole 117 into heater box 120 so that the temperatures with the heater box 120 can be monitored. Tabs 118 can be located at various parts of sides 113, 114, 116 and can provide attachments to other components of an HVAC cabinet or can be used to hold insulation in place around the heater box 120. Attachments to other components or the cabinet can be by bolts, screws, sealants, other means, or combinations of the foregoing. Sides 113, 114, 116 can be comprised of one piece of sheet metal, or can be several different pieces joined together such as by sauntering. Other materials besides sheet metal may be used as well.

FIGS. 4A-4D show several views of insulation 112. Insulation 112 should be cut to fit around the heater box 120. Notches 119 can take a variety of shapes and are meant to provide space for other components of the heater box 120 or the HVAC system. For example, notches can be provided for the control board bracket 125 or the thermostatic switch 115. Insulation 112 can comprise a variety of insulation materials, such as fiberglass, foam and other types. Insulation 112 can be kept in place by tabs on the panels of the heater box. Other attachment mechanisms can be used such as adhesives.

Figure 5:
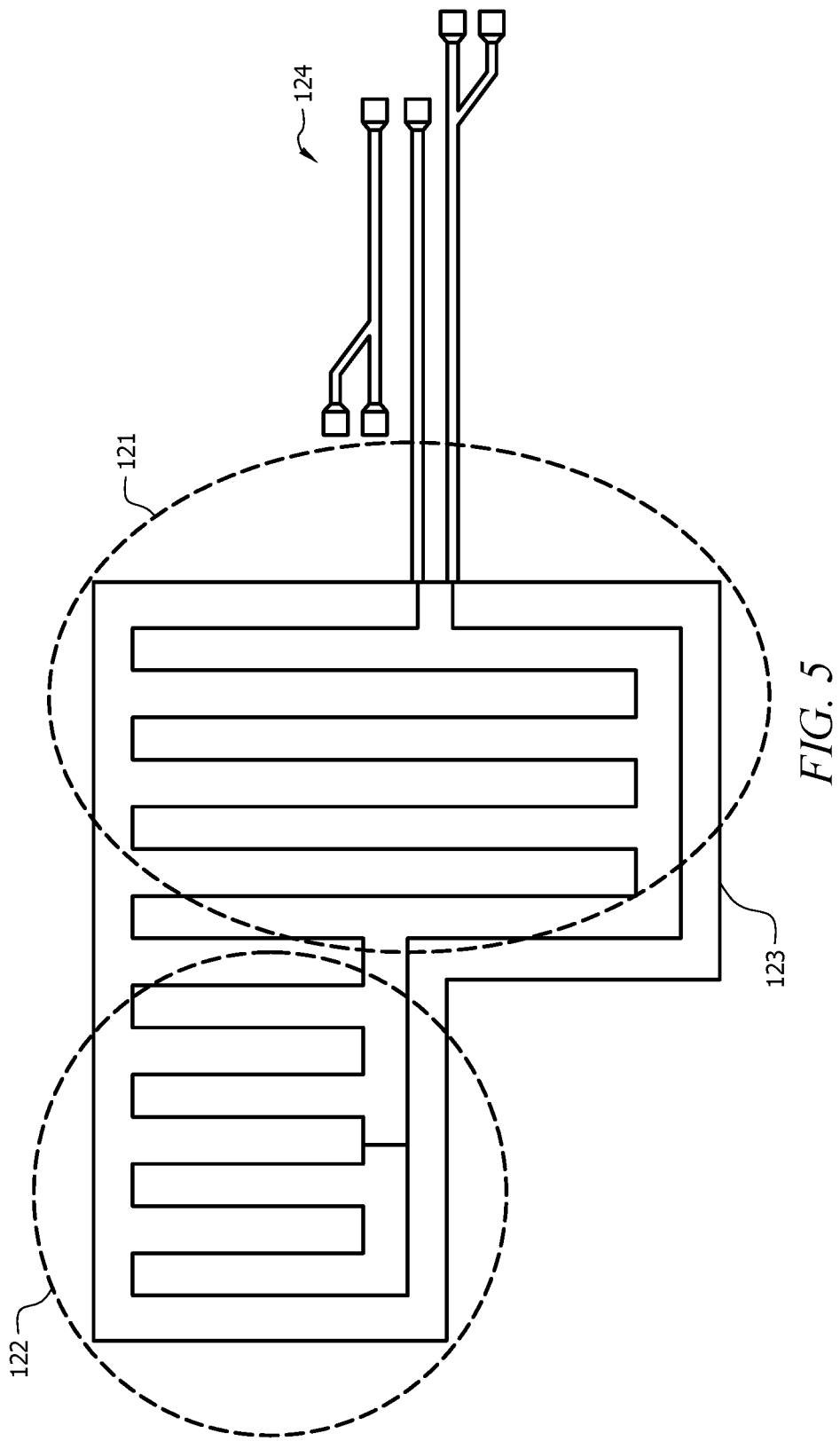
FIG. 5 is a diagram of embodiments of components of a heater box under the present disclosure.
Figure 6A:
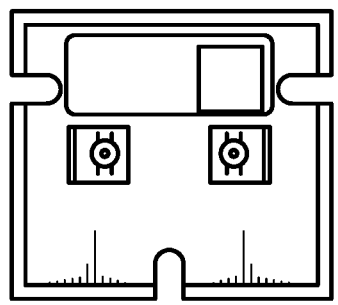
FIGS. 6A-6D are diagrams of embodiments of components of a heater box under the present disclosure.
Figure 6B:
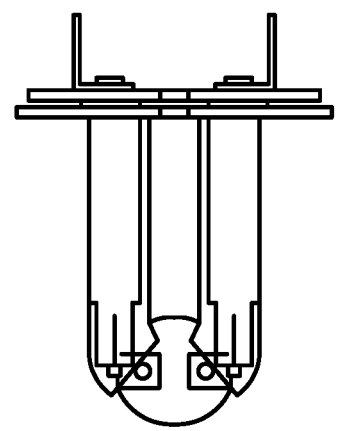
Figure 6C:
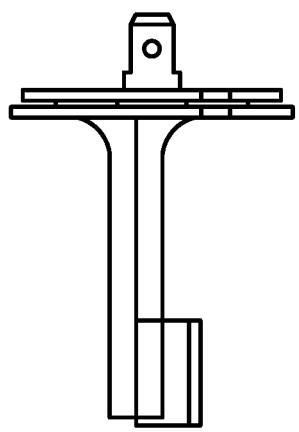
Figure 6D:
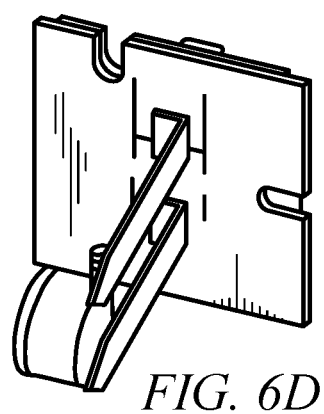

FIG. 5 shows an embodiment of a resistance heater 123 for use with a heater box 120. Resistance heater 123 can comprise several portions 121, 122 that will attach to different sides of heater box 123. For instance, in the embodiment shown, the resistance heater 123 can be folded between portions 121, 122 and portion 121 can attach to bottom side 114 and portion 122 can attach to side 113 of heater box 120. Other embodiments could comprise more portions to fit onto other sides of the heater box 120. Other embodiments could comprise a plurality of separate resistance heaters. Electrical leads 124 extend from the heater 123 and can attach to thermostatic switch 115. When the temperature within heater box 120 reaches a value chosen by a user then the switch 115 will activate the heater 123 via the electrical leads 124. This will then raise the temperature within the box and melt any frozen or freezing condensate. In a preferred embodiment the resistance heater 123 will be attached to walls of the heater box 120 by some type of adhesive, although other attachment means are possible as well.

FIGS. 6A-6D show several views of the thermostatic switch 115. Thermostatic switch 115 will attach and extend into heater box 120 via a hole 117. Other means of attachment or deployment of the thermostatic switch 115 can be used as well. A variety of temperature sensors and switches can be used to comprise the thermostatic switch 115.

Figure 7:
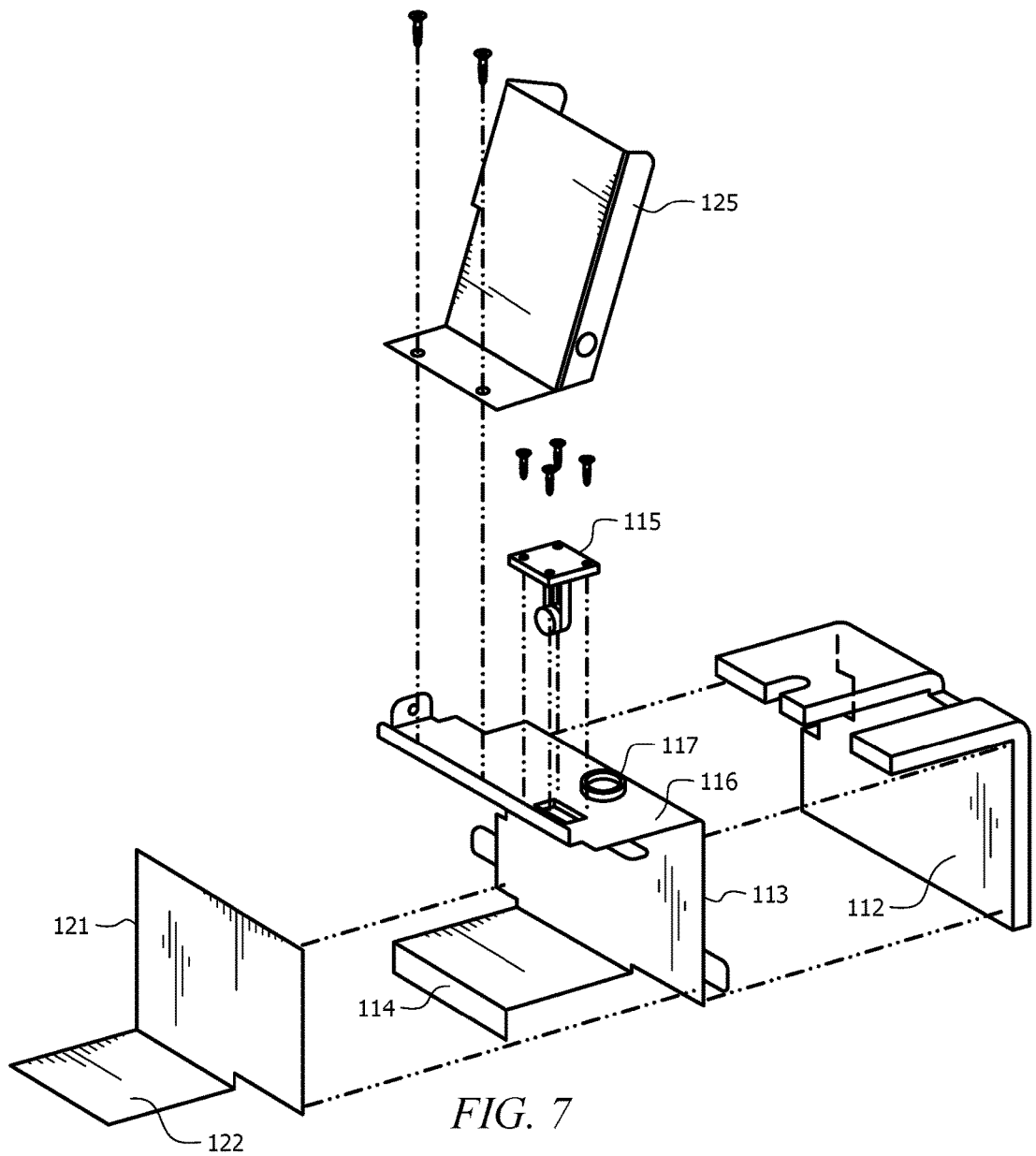
FIG. 7 is a diagram of an embodiment of a heater box under the present disclosure.

FIG. 7 shows an embodiment of various components of heater box 120 as they attach and relate to each other. Sides 113, 114, 116 receive resistance heaters 121, 122 that can affix by adhesive to walls 113, 114. Thermostatic switch 115 extends through hole 117 into the heater box 120 and can be held in place by bolts. Control board bracket 125 can attach to the top surface 116 of the heater box 120. Control board bracket 125 can hold various controllers or processor 128 or other sensors for control of the HVAC system. Insulation 112 attaches to the outside surfaces of heater box 120.

A preferred embodiment of the present disclosure is a heater box that is manufactured and installed with an original HVAC system. However, retrofit embodiments are possible as well. In a retrofit situation, a user can remove an access panel/wall of an HVAC cabinet, locate the drain hoses and drain trap, and install a plurality of panels to surround these components. A thermostatic switch and resistance heaters can be installed. In some situations ancillary components of the cabinet may have to be moved. For example, an ignition control board can be installed to hold controllers or other components that must move to accommodate the heater box.

The embodiments of the heater box described above show a C-shaped enclosure constructed of sheet metal. Other embodiments may comprise various shapes and geometries. Some embodiments may require fewer or more sides, for example two-sided or four-sided embodiments. Furthermore, certain embodiments may comprise end pieces. In the embodiments shown above, the end walls are provided by walls of the HVAC cabinet. Some embodiments may use separate end pieces, for example if the heater box does not extend from one cabinet wall to another. Various embodiments can comprise openings, holes and other partitions for hoses or other components going in or out of the heater box.

The thermostatic switch 115 and electrical leads 124, described above, can connect to a controller for the entire HVAC system. The system controller could then monitor temperatures within the heater box and actuate the resistance heaters as necessary. Alternatively, the thermostatic switch and the resistance heaters can comprise a "closed circuit" independent of other controllers or electrical components in the HVAC system.

Figure 8:
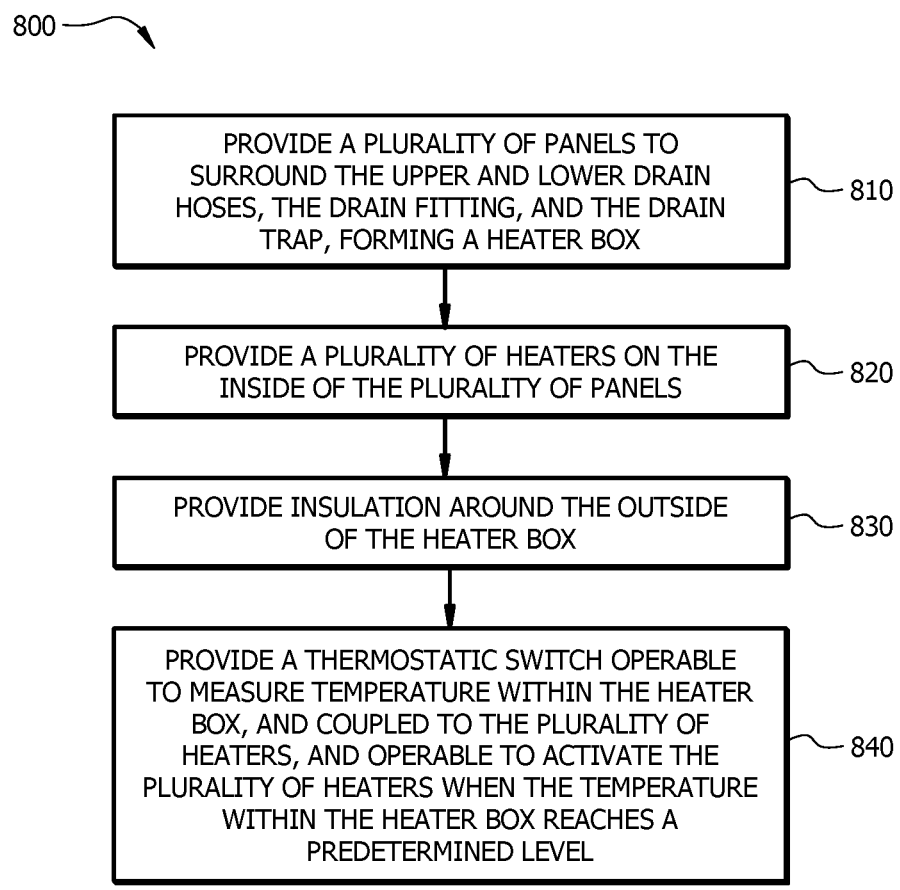
FIG. 8 is a flow-chart diagram of a method embodiment under the present disclosure.
Figure 9A:
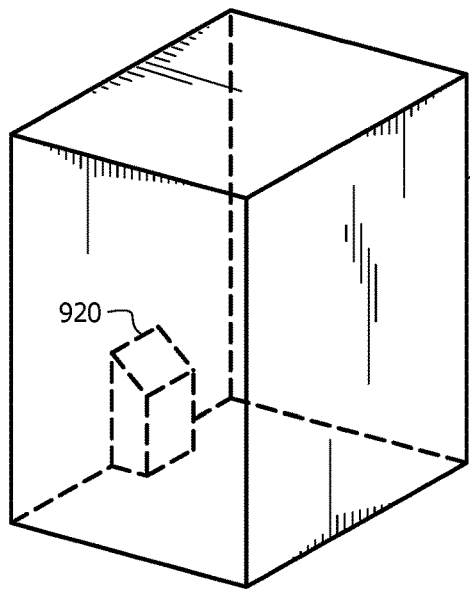
FIGS. 9A-9D are diagrams of embodiments of heater boxes under the present disclosure.
Figure 9B:
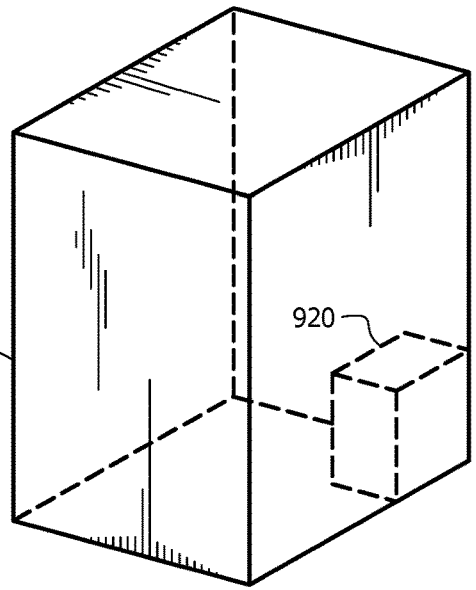
Figure 9C:
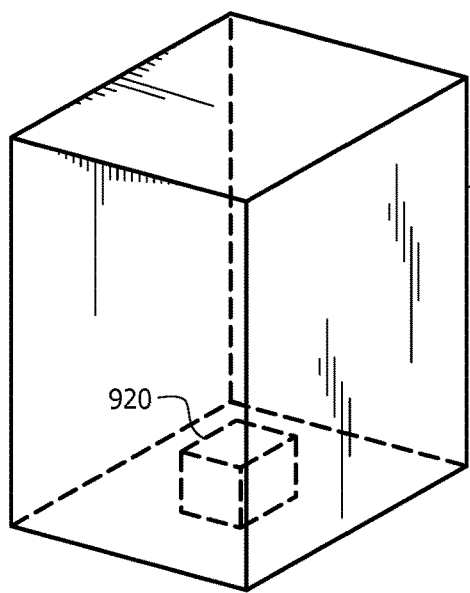
Figure 9D:
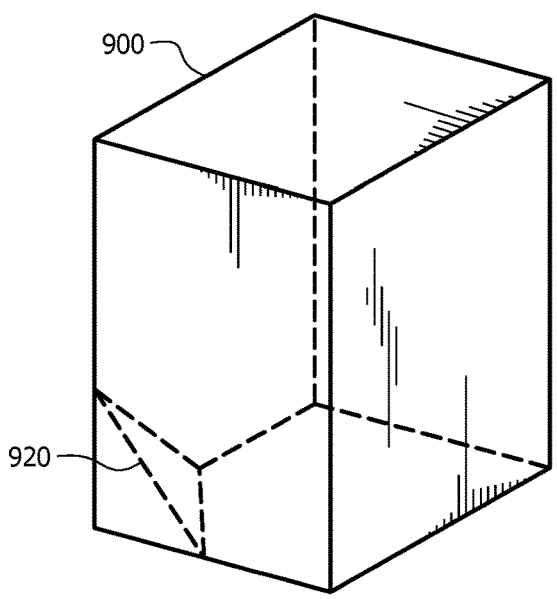

FIG. 8 displays a method embodiment for manufacturing a heater box embodiment under the present disclosure. At step 810, a plurality of panels is provided to surround the upper and lower drain hoses, the drain fitting and the drain trap in an HVAC cabinet, forming a heater box. At step 820 a plurality of heaters are provided on the inside of the heater box. At step 830 insulation is provided around the outside of the box. At step 840 a thermostatic switch is provided within the heater box. The thermostatic switch is operable to measure temperature within the heater box and is coupled to the plurality of heaters. The switch is operable to activate the plurality of heaters when the temperature within the heater box reaches a predetermined level.

Several different embodiments of heater boxes or compartments can be seen in FIG. 9A-9D. As shown, the location, shape, and size of compartment 920 within cabinet 900 can be adjusted. Other components of a cabinet are omitted for clarity. A compartment 920 can be adjusted to fit the drainage needs of any given HVAC cabinet. The size, shape, layout, configuration of the panels, drain traps, hoses, connectors, heating elements, switches, and more, can be adjusted for a specific embodiment.

Figure 10:
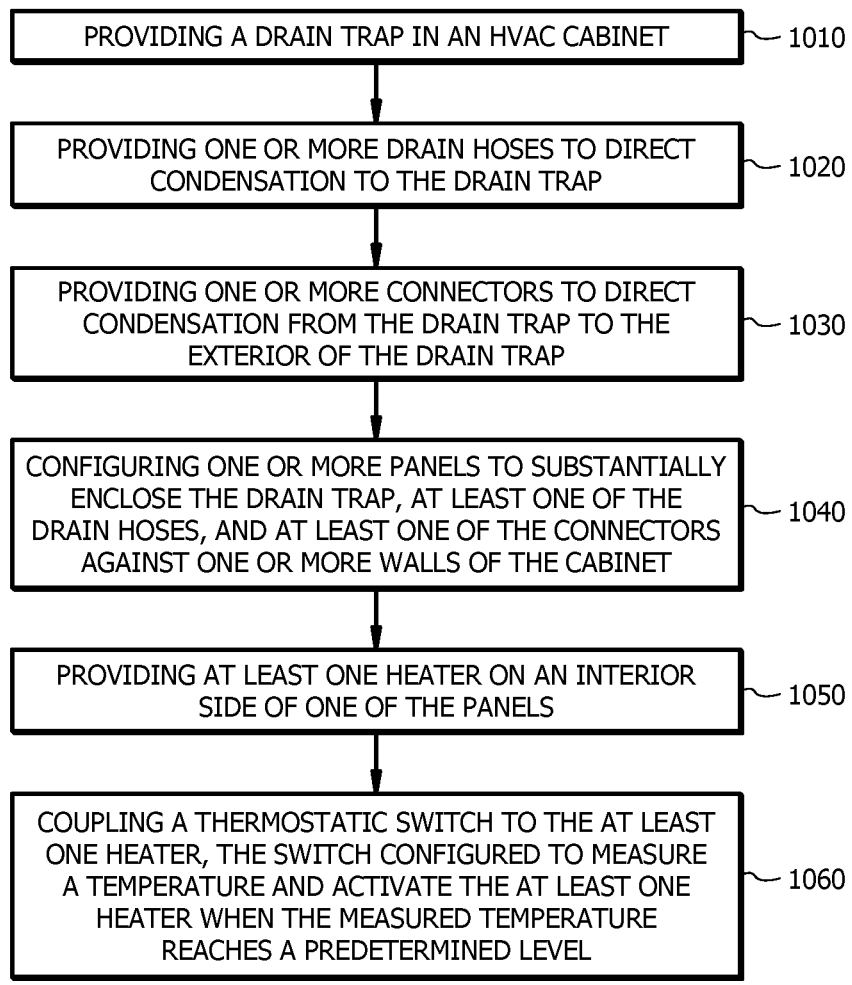
FIG. 10 is a flow-chart diagram of a method embodiment under the present disclosure.

FIG. 10 shows another possible method embodiment 1000 under the present disclosure. At 1010, a drain trap is provided within an HVAC cabinet. At 1020, one or more drain hoses are provided and configured to direct condensation within the HVAC cabinet into the drain trap. At 1030, one or more connectors are provided and configured to direct condensation from the drain trap to the exterior of the HVAC cabinet. At 1040, one or more panels are provided and configured to substantially enclose the drain trap, at least one of the one or more drain hoses, and at least one of the one or more connectors, against one or more walls of the HVAC cabinet. At 1050, one or more heaters is provided on an interior side of the one or more panels. At 1060, a thermostatic switch is coupled to the at least one heater, the thermostatic switch configured to measure a temperature and activate the at least one heater when the measured temperature reaches a predetermined level.

Figure 11:
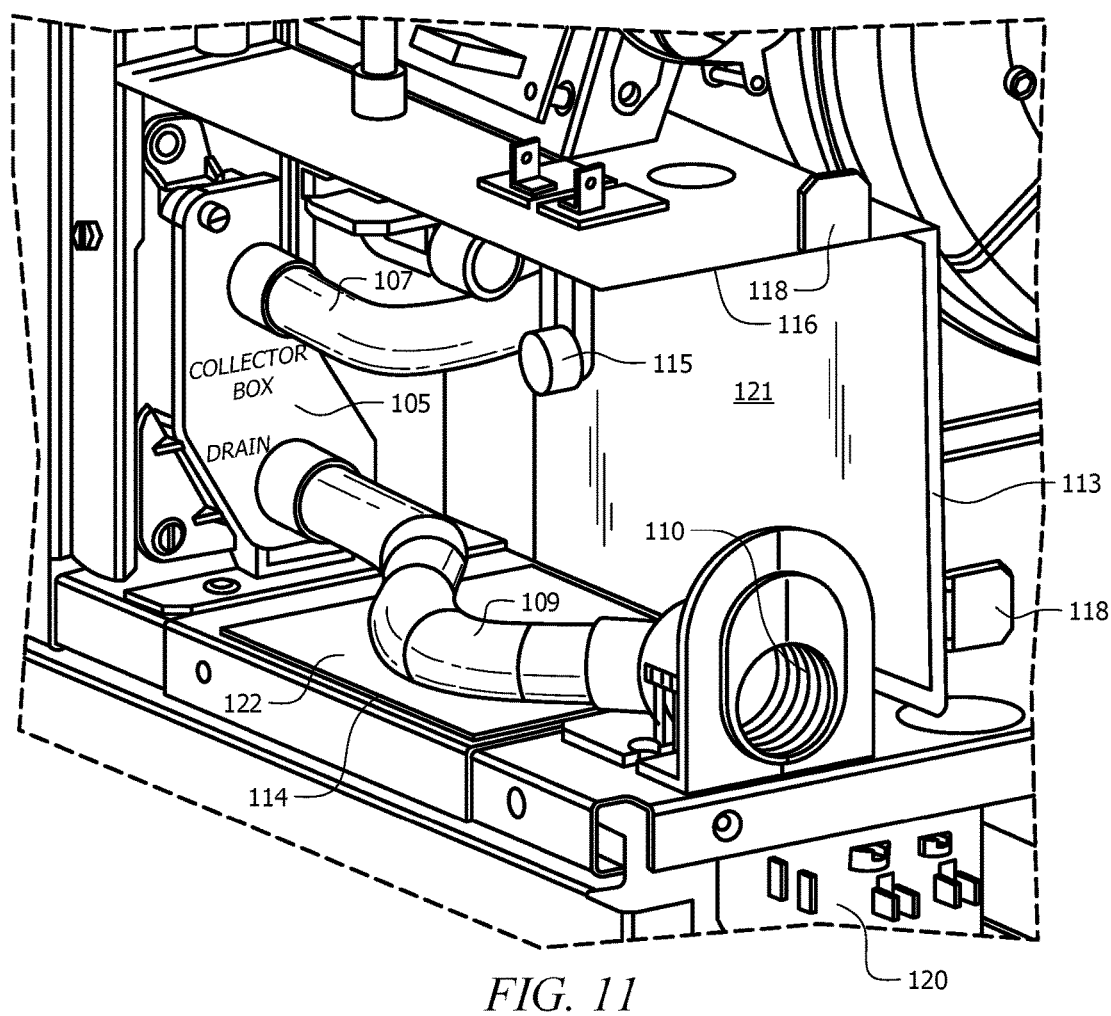
FIG. 11 is a diagram of a possible embodiment under the present disclosure.
Figure 12:
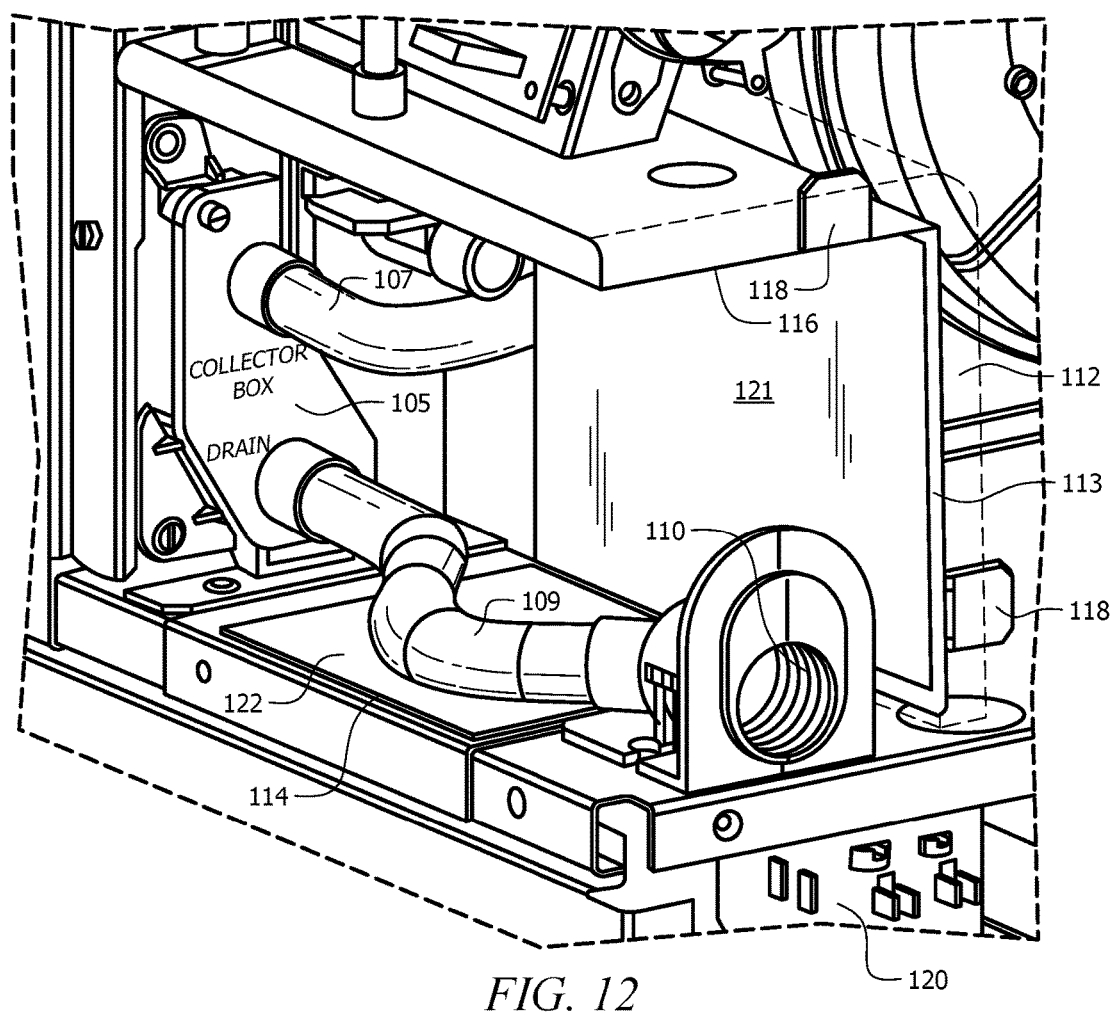
FIG. 12 is a diagram of a possible embodiment under the present disclosure.

FIGS. 11 and 12 display several other embodiments of the present disclosure. Heater boxes under the present disclosure can exclude various elements and still achieve the goals desired. For instance, in FIG. 11 a heater box 120 is displayed similar to the embodiment shown in FIG. 2. However, in the embodiment of FIG. 11 there is no insulation 112. Such an embodiment could be used in situations where insulation is not desired, or when insulation is expensive, dangerous or otherwise avoided. FIG. 12 also shows an embodiment similar to FIG. 2. However, in this embodiment there is no thermostatic switch 115. In such embodiments the heaters 121, 122 can be controlled by a controller, a timer, or another appropriate means. Other elements of FIG. 2 can be excluded, similar to the embodiments of FIGS. 11 and 12, depending on a user's needs, space constraints or other limiting factors. For example, various embodiments could comprise more or less drain tubes, hoses, or connectors.

Although the present invention and its advantages have been described in detail, it should be understood that various changes, substitutions and alterations can be made herein without departing from the spirit and scope of the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A heated compartment within an HVAC cabinet, the compartment comprising:
    a plurality of panels forming an enclosure around an upper and lower drain hose, a drain fitting, and a drain trap, the plurality of panels comprising a first panel forming a bottom of the compartment and a second panel forming a side of the compartment, the second panel defining a venting hole in the second panel;
    a first heater attached to the first panel and interior to the enclosure, the first heater positioned beneath the lower drain hose;
    a second heater attached to the second panel and interior to the enclosure, the second heater positioned beside the upper and lower drain hoses;
    insulation attached to the second panel and exterior to the enclosure;
    a thermostatic switch within the enclosure and coupled to the first and second heaters, the thermostatic switch operable to measure the temperature within the enclosure and activate the first and second heaters when the temperature within the enclosure reaches a predetermined level; and
    a processor attached to one of the plurality of panels and exterior to the enclosure.

2. The heated compartment of claim 1 wherein the heated compartment comprises two panels joined along one edge and extending from one wall of the HVAC cabinet to another wall.

3. The heated compartment of claim 1 wherein the predetermined level is 49 degrees Fahrenheit.

4. The heated compartment of claim 1 wherein the heated compartment comprises three panels.

5. The heated compartment of claim 1 wherein the plurality of panels comprise tabs configured to hold the insulation in place.

6. The heated compartment of claim 1 wherein the plurality of panels comprise a C-shaped enclosure.

7. A heated compartment within an HVAC cabinet, the compartment comprising:
    one or more panels forming an enclosure with another of the one or more panels or with one or more walls of the HVAC cabinet, wherein the enclosure substantially surrounds at least one of a drain hose, a drain fitting, and a drain trap, a first panel of the one or more panels forming a bottom of the enclosure, a second panel of the one or more panels forming a side of the enclosure, the second panel defining a venting hole in the second panel;
    a first heater attached to the first panel and interior to the enclosure, the first heater positioned beneath the lower drain hose;
    a second heater attached to the second panel and interior to the enclosure, the second heater positioned beside the upper and lower drain hoses;
    insulation attached to the second panel and exterior to the enclosure;
    a thermostatic switch within the enclosure and coupled to the first and second heaters, the thermostatic switch operable to measure the temperature within the enclosure and activate the first and second heaters when the temperature within the enclosure reaches a predetermined level; and
    a processor attached to one of the plurality of panels and exterior to the enclosure.

8. The heated compartment of claim 7 wherein the heated compartment comprises two panels joined along one edge and extending from one wall of the HVAC cabinet to another wall.

9. The heated compartment of claim 7 wherein the predetermined level is 49 degrees Fahrenheit.

10. The heated compartment of claim 7 wherein the heated compartment comprises three panels.

11. The heated compartment of claim 7 wherein the plurality of panels comprise tabs configured to hold the insulation in place.

12. The heated compartment of claim 7 wherein the one or more panels comprise a C-shaped enclosure.

13. A method of constructing a heated compartment in an HVAC cabinet, the method comprising:
    providing a drain trap disposed within the HVAC cabinet;
    providing one or more drain hoses configured to direct condensation within the HVAC cabinet into the drain trap;
    providing one or more connectors configured to direct condensation from the drain trap to the exterior of the HVAC cabinet;
    configuring one or more panels to substantially enclose the drain trap, at least one of the one or more drain hoses, and at least one of the one or more connectors, against one or more walls of the HVAC cabinet, the one or more panels comprising a first panel positioned below the one or more drain hoses and a second panel positioned to a side of the one or more drain hoses;
    providing a vent hole in the second panel;
    providing a first heater on an interior side of the first panel, the first heater positioned beneath the lower drain hose;
    providing a second heater on an interior side of the second panel the second heater positioned beside the upper and lower drain hoses;
    applying insulation to an exterior side of the second panel;
    coupling a thermostatic switch to the first and second heaters, the thermostatic switch configured to measure a temperature and activate the first and second heaters when the measured temperature reaches a predetermined level; and
    providing a processor attached to an exterior side of the one or more panels.

14. The method of claim 13, further comprising providing tabs to hold the insulation in place.

* * * * *